Feb. 5, 1929.  1,701,237
W. V. JUSTICE ET AL
BRAKE
Filed Jan. 19, 1926

Inventor
Wm. V. Justice
AND Hugh A. Stewart
By Mason Fenwick & Lawrence
Attorneys Patented Feb. 5, 1929.

1,701,237

UNITED STATES PATENT OFFICE.

WILLIAM V. JUSTICE AND HUGH ALLON STEWART, OF ROSSITER, PENNSYLVANIA.

BRAKE.

Application filed January 19, 1926. Serial No. 82,309.

This invention relates to improvements in brakes particularly adapted for use in connection with automobile wheels, and has for its object to provide a brake of the cone-type which shall be of simple construction and efficient in use.

The various features of novelty and invention will appear from the detailed description taken in connection with the accompanying sheet of drawings forming a part of the specification.

Referring to drawings.

Figure 1:
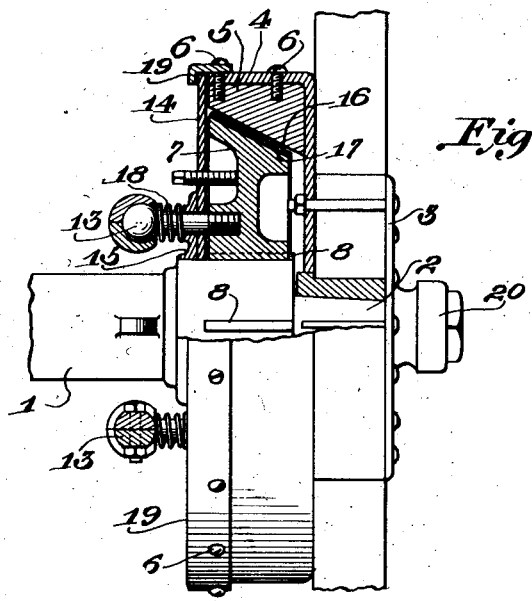
Fig. 1 is a view partly in section and partly in elevation showing the improved brake.
Figure 2:
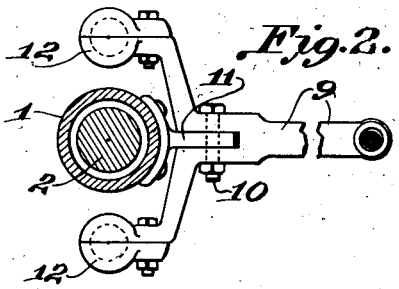
Fig. 2 is a view showing the operating yoke or lever by means of which the brake is operated.

In the drawings, 1 indicates the conventional rear axle housing within which is contained the drive shaft 2, and on which is mounted the wheel 3. Secured to the wheel is the conventional type of brake drum having a laterally directed flange 4. Arranged within the drum is an annular friction member 5, this member being removably secured to the brake drum flange 4 in any suitable manner as by means of screws 6. Cooperating with the friction member 5 is a cone member 7, this member being slidably mounted on the housing 1 as by means of radial ribs or keys 8. The cone member is adapted to be shifted into contacting relation with friction member 5 by a lever 9 of Y-type, said lever being pivoted as at 10 to a radially projecting bracket 11 on housing 1. The arms 12 of the lever overlie the housing on either side thereof and are connected to studs 13 which extend laterally from the cone member 7. These studs extend through a cover-plate 14 which is non-turnably secured to the housing 1 as by means of brackets 15.

Referring to Fig. 1, it will be noted that the annular friction member 5 is flared upwardly and outwardly from the wheel 3, as indicated at 16. The cone member 7 is also preferably provided with a suitable friction member 17. Surrounding the studs 13 between the bracket 15 to which the cover-plate 14 is secured and the end of the arms 12 of the operating lever 9 are springs 18 which tend to draw or hold cone member 7 away from the annular member 5 within the brake drum.

Secured to the flange 4 of the brake drum is a flanged member 19, this member serving two purposes, namely, to prevent the entry of dust and the like into the brake drum and also to prevent the wheel from becoming disengaged from the driving shaft 2 in case nut 20 which confines the wheel on the shaft should accidentally come off.

From the above it will be seen that there has been provided a brake of the cone-type which is very simple in construction and which may be readily substituted for the conventional expanding brake of the type commonly employed. To install the present type of brake, it is merely necessary to secure the annular ring 5 within the brake drum as by means of the screw 6 and to provide the cone member as shown.

What is claimed is:

In combination with a wheel and axle housing, a brake drum secured to the wheel and an annular friction member secured within the drum and having an inclined surface, a cone-shaped member shiftably mounted on the housing, a cover-plate for the drum secured to the housing, a flanged member secured to the drum and overhanging the peripheral edge of cover-plate, and means for shifting the cone-member.

In testimony whereof we affix our signatures.

WM. V. JUSTICE.
HUGH ALLON STEWART.